US012754880B2

(12) United States Patent
Pattath et al.

(10) Patent No.: US 12,754,880 B2
(45) Date of Patent: Oct. 6, 2026

(54) DYNAMIC CONFIGURATION OF BACKUP RETENTION USING MACHINE LEARNING

(71) Applicant: SAP SE, Walldorf (DE)

(72) Inventors: Sreekanth Kozhisseri Pattath, Bangalore (IN); Sreeram V, Palakkad (IN); Rajwin Victor Jesudason, TamilNadu (IN); Sanjeev Peddi Reddi Gari, Chittoor (IN); Ayush Jain, Meerut (IN); Meenakshi Meenakshi, Bangalore (IN); Shivkumar Chakkenchath, San Ramon, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/913,022

(22) Filed: Oct. 11, 2024

(65) Prior Publication Data

US 2026/0105024 A1 Apr. 16, 2026

(51) Int. Cl.
*G06F 16/11* (2019.01)
*G06F 11/1446* (2026.01)
*G06N 20/00* (2019.01)

(52) U.S. Cl.
CPC ........ *G06F 16/125* (2019.01); *G06F 11/1448* (2013.01); *G06F 11/1461* (2013.01); *G06N 20/00* (2019.01); *G06F 2201/80* (2013.01)

(58) Field of Classification Search
CPC ............... G06F 11/1448; G06F 16/125; G06F 2201/80; G06N 20/00
See application file for complete search history.

(56) References Cited

U.S. PATENT DOCUMENTS

| | | | | |
|---|---|---|---|---|
| 5,434,992 A * | 7/1995 | Mattson | G06F 12/0848 711/119 |
| 8,924,352 B1 * | 12/2014 | Andruss | G06F 11/1461 707/654 |
| 11,061,780 B1 | 7/2021 | Marelas et al. | |
| 11,307,940 B2 | 4/2022 | Bezerra Maimoni et al. | |
| 11,513,908 B2 | 11/2022 | Wolfson et al. | |
| 2004/0243699 A1 * | 12/2004 | Koclanes | H04L 41/5019 709/224 |
| 2006/0179087 A1 * | 8/2006 | Fujii | G06F 3/0619 707/999.205 |
| 2006/0236061 A1 * | 10/2006 | Koclanes | G06F 3/0631 711/170 |
| 2013/0198449 A1 * | 8/2013 | Belluomini | G06F 16/11 711/117 |
| 2015/0172120 A1 * | 6/2015 | Dwarampudi | G06F 16/20 709/221 |
| 2018/0357228 A1 * | 12/2018 | Chen | G06F 16/164 |
| 2020/0364113 A1 * | 11/2020 | Tormasov | G06F 11/1461 |
| 2020/0401559 A1 * | 12/2020 | Varma | G06F 11/1448 |

(Continued)

*Primary Examiner* — Kavita Stanley
*Assistant Examiner* — Jedidiah P Ferrer
(74) *Attorney, Agent, or Firm* — SCHWEGMAN LUNDBERG & WOESSNER, P.A.

(57) ABSTRACT

In an example embodiment, machine learning is leveraged to predict volume importance. A machine learning model is trained to classify volumes based on "importance", and more specifically how important it is for a backup of a volume to be retained for a longer period. Different volumes may be given different volume importance classifications, and thus may be assigned different backup retention periods. This ensures that the backup strategy remains responsive to changes in data dynamics.

17 Claims, 5 Drawing Sheets

(56) References Cited

U.S. PATENT DOCUMENTS

| | | | | |
|---|---|---|---|---|
| 2021/0406269 | A1* | 12/2021 | Xiong | G06F 16/24578 |
| 2022/0019685 | A1 | 1/2022 | Marzorati et al. | |
| 2023/0093900 | A1 | 3/2023 | Scope et al. | |
| 2025/0117808 | A1* | 4/2025 | Hogan | G06N 20/00 |

* cited by examiner

DYNAMIC CONFIGURATION OF BACKUP RETENTION USING MACHINE LEARNING

TECHNICAL FIELD

This document generally relates to computer systems. More specifically, this document relates to the dynamic configuration of backup retention using machine learning.

BACKGROUND

In contemporary data management, efficient handling of diverse datasets is desired. It is common for backups of data volumes to occur fairly frequently to guard against issues that can cause corruption or deletion of data in volumes. Often these backups are automated and occur at regular frequencies (e.g., once per day). A retention period for backups is typically specified in a system, such that the system deletes a backup once its retention period has elapsed. For example, one system may have a 30-day retention period such that backups of volumes in that system are deleted 30 days after they are created.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
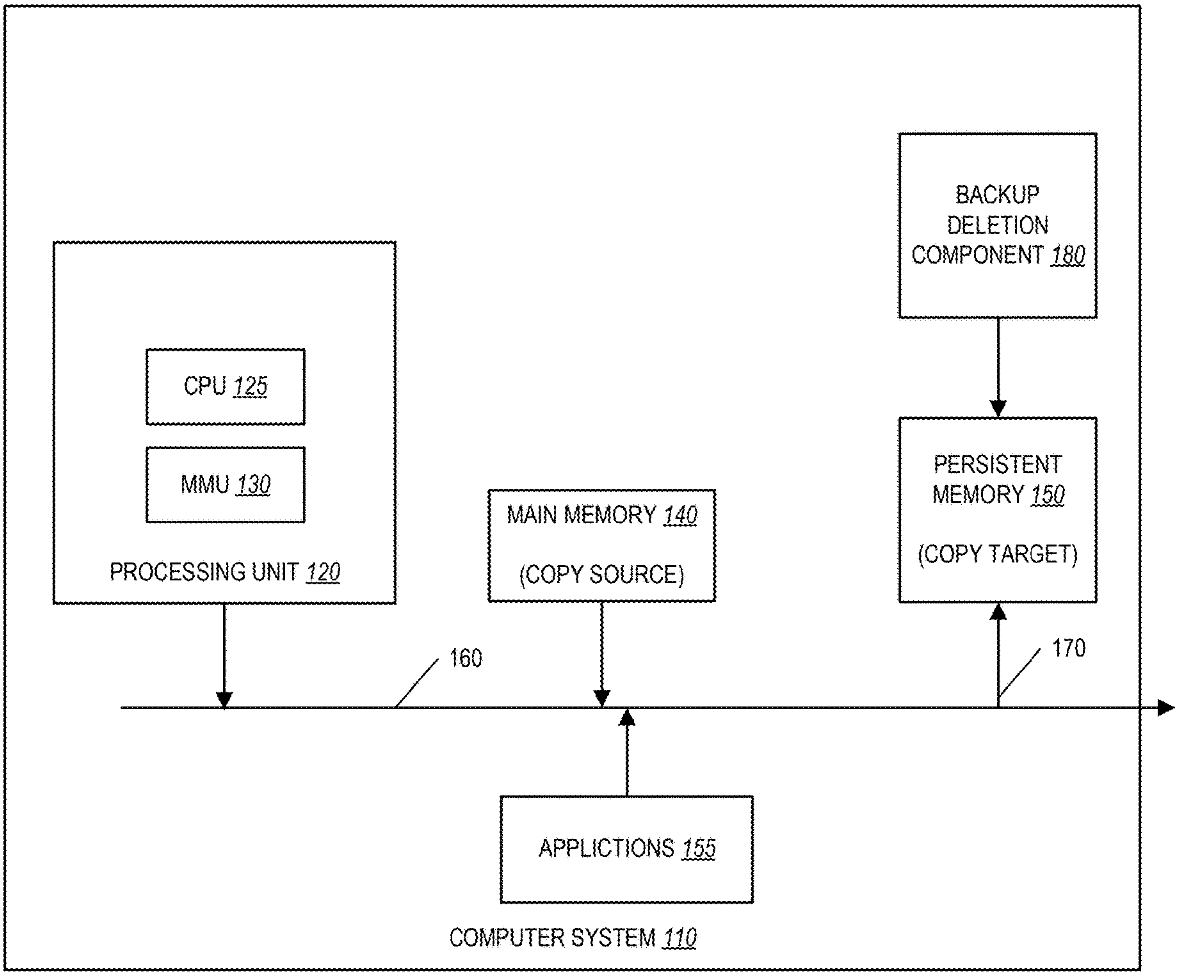
FIG. 1 is a block diagram of a database system such as an in-memory database system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Existing systems lack the adaptability needed for dynamic environments, relying on static configurations that do not adequately respond to evolving data patterns.

More specifically, the conventional approach involves specifying a static retention period such that backups of volumes within the system are deleted after that static retention period. Such an approach, however, lacks responsiveness to changing data dynamics. Fixed configurations may lead to suboptimal resource allocation and storage inefficiencies, especially in dynamic cloud environments. There is a need for a more adaptive and intelligent system that can dynamically configure backup retention periods based on the evolving importance of data.

In an example embodiment, machine learning is leveraged to predict volume importance. A machine learning model is trained to classify volumes based on "importance", and more specifically how important it is for a backup of a volume to be retained for a longer period. Different volumes may be given different volume importance classifications, and thus may be assigned different backup retention periods. This ensures that the backup strategy remains responsive to changes in data dynamics.

By leveraging machine learning predictions and cloud provider application program interfaces (APIs), the system achieves efficiency in the configuration of backup retention periods. Automation reduces the need for manual intervention, leading to a streamlined and responsive data management process.

Regular reviews and dynamic adjustments contribute to the optimization of storage associated with snapshots and backups. The system ensures that resources are allocated efficiently based on the importance of data.

It should be noted that the backup retention periods discussed herein pertain specifically to the retention periods of the volumes as a whole. It is also possible for individual files, or groups of files, to have their own retention periods that may or may not be consistent with the corresponding volume backup retention periods for their corresponding volumes. Any inconsistencies can be resolved using one of various techniques. In one example embodiment, if a volume retention period conflicts with a file retention period for any file stored on the volume, then the retention period will default to the longer of the conflicting retention periods. In another example embodiment, if the conflicting retention periods are close in time to one another, then both retention period can be used, to the extent possible. Specifically, for example, there may be a threshold that is defined as to what an acceptable length of time between conflicting retention periods. If, for example, that acceptable length is defined as one week, then if a volume retention period for volume A is set to expire 7 days from now and a file retention period for a file on volume A is set to expire 6 days from now, then the file can be deleted on day 6 and the rest of the volume on day 7 since their retention periods are within the threshold. If the volume retention period for volume A is set to expire 6 days from now and the file retention period is set to expire 7 days now, then the volume, including file A, can be deleted at 6 days (since the volume includes the file).

In an example embodiment, the machine learning model is a Support Vector Machine (SVM).

Support Vector Machines (SVM) are a type of supervised learning algorithm used for classification, regression, and other tasks. SVM finds a hyperplane that separates the different classes in the data. The goal is to maximize the margin between classes (the distance between the hyperplane and the nearest data points from each class, which are referred to as support vectors). SVMs can also efficiently perform non-linear classification by using what is called a "kernel trick". This involves transforming the feature space into a higher-dimensional space where the data points can be linearly separated. The SVM algorithm can also optimize a cost function that penalizes misclassifications. The parameters of the SVM model, including the position of the hyperplane and the support vectors, are determined by this optimization process. Once the optimal hyperplane is found, the SVM can classify new data points by determining which side of the hyperplane on which they fall.

Other types of machine learning algorithms could be utilized instead of or in addition to SVM include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

Furthermore, the techniques describe herein may be applied to backup any type of data volume. This includes, but is not limited, to databases. Additionally, in some example embodiments one or more of the volumes being backed up are in-memory databases. An in-memory database is a database that stores its data in system memory, such as Random Access Memory (RAM).

An in-memory database may perform both transactional and analytic data processing due to the speed available from storing the data in main memory (as opposed to the disk storage). In-memory databases enable organizations to analyze their business operations using huge volumes of detailed information while the business is running. In-memory computing technology allows the processing of massive quantities of data in main memory to provide quick results from analysis and transaction. Ideally, the data to be processed is real-time data (that is, data that is available for processing or analysis immediately after it is created). This enables organizations to instantly explore and analyze all of its transactional and analytical data in real time. The in-memory database holds the bulk of its data in main memory for maximum performance, but it still uses persistent storage to provide a fallback in case of failure. For example, after a power failure, the database can be restarted like any disk-based database and returns to its last consistent state.

Typically, backups are required protection against data loss, e.g., resulting from hardware failure. However, making a backup of the data kept in the main memory could be an intensive task resulting in performance slowdowns, making it difficult if not impossible to access the data in parallel by other processing functions. To avoid/reduce downtime due to backup operations, a Snapshot mechanism is employed directly in a Memory Management Unit (MMU) of the Central Processing Unit (CPU).

FIG. 1 is a block diagram of a database system such as an in-memory database system, in accordance with an example embodiment. A computer system 110 is provided within which a set of instructions may be executed to cause the in-memory database system to perform the processes discussed hereinafter. The computer system may be a personal computer (PC), a tablet PC, a Personal Digital Assistant (PDA), a cellular telephone, a web appliance, a server, or any device capable of executing a set of instructions. Further, while only a single computer system is illustrated, the term "computer" shall also be understood to include a collection of computers that individually or jointly execute a set (or multiple sets) of instructions to perform any one or more of the processes discussed herein.

The computer system 110 includes processing unit 120, main memory 140, persistent memory 150, and one or more applications 155. The term "main memory" as used herein is a volatile memory such as RAM, dynamic random access memory (DRAM) such as synchronous DRAM (SDRAM) or Rambus DRAM (RDRAM), etc. The persistent memory 150 is a non-volatile memory such as flash memory, hard disk drive, optical drive, etc. The main memory 140 and the processing unit 120 communicate with each other via bus 160. The processing unit 120 and the persistent memory 150 communicate with each other via interface 170.

The processing unit 120 includes one or more general purpose processing devices such as a microprocessor, central processing unit (CPU) 125, memory management unit (MMU) 130 or the like. The MMU 130 is responsible for handling accesses to memory requested by the CPU 125. Its functions include translation of virtual addresses to physical addresses (i.e., virtual memory management), memory protection, cache control, bus arbitration, etc. The MMU typically divides the virtual address space (the range of addresses used by the processor) into pages, each having a size which is a power of 2, usually a few kilobytes. The processing unit 120 is configured to execute the processing logic for performing the operations and steps discussed herein below.

As discussed above, the in-memory database primarily relies on main memory 140 for computer data storage, in contrast to database management systems that rely on disk storage. Main memory databases are faster than disk-optimized databases since the internal optimization algorithms are simpler and execute fewer CPU instructions. Accessing data in main memory reduces seek time when querying the data, which provides faster and more predictable performance than when accessing data on disk. In their simplest form, main memory databases store data on volatile memory devices.

Applications 155 provide interface for generating system calls to open, read, write, or close memory blocks in the main memory 140. A kernel space within the In-memory database system includes a system call interface that switches the system calls from the applications to one or more memory block in the main memory 140 with read/write requests and other administrative tasks.

In an embodiment, the MMU 130 includes a backup manager for saving a Snapshot of a database in Main memory 140 to persistent memory 150. In an aspect, the main memory 140 is divided into fixed size blocks, which are sequences of bytes or bits. A block may be the Smallest unit of Storage space that is allocated/managed.

Typical block sizes include 1 Kb. 2 Kb. 4 Kb and 8 Kb. A block group is a sequence of blocks, and is also known as an extent. A snapshot mechanism is implemented in the MMU 130 for making a backups of databases stored in the main memory 140. A Snapshot is the state of a database at a particular point in time. A database Snapshot provides a read only, static view of a source database as it existed at the time of Snapshot creation, minus any uncommitted transactions. Snapshot maybe generated periodically, or, at least when, for example, the in-memory database is doing a controlled shut-down.

In an example embodiment, a backup of a data set is performed by taking a snapshot of a data structure for the data set. As used herein, the term "data structure" refers to a structure having meta-data describing which blocks of data in the main memory form a particular data set. In an example embodiment, the data structure is a Link Descriptor Table (LDT) that represents a stream of data in the main memory. Since database snapshots operate at the data-page level, an original page is copied from the source database to the snapshot before the page of the source database is modified for the first time. The snapshot stores the original page, preserving the data records as they existed when the snapshot was created. Subsequent updates to records in a modified page do not affect the contents of the Snapshot.

In an example embodiment, in order to make the data set available for subsequent changes/modifications or write operations, the data set is configured as read-only and a snapshot of the data structure for the data set is copied to a memory space in the main memory. Subsequent to taking the snapshot, the data set is made available for processing/manipulation by any requesting programs. Any subsequent changes or updates to the data set after the snapshot may be captured during a subsequent backup operation. However, instead of duplicating all the blocks of data (forming the data stream) each time the data set is subject to modification, only particular blocks, i.e., only the blocks representing the data that is requested for modification is duplicated. The duplicated data block is stored in a free block in the main memory 140. A free block is an empty block that contains no data and has not yet been allocated memory space for data. The data structure is then updated by replacing the meta-data identifying the data block for the original data prior to modification with a meta-data identifying the free block which currently holds the duplicated data. The applications requesting access to the data for modification may access the duplicated data in the new memory block and perform parallel processing of the data set while a backup operation is being performed on the original data set. In an aspect, the backup of the original data set is performed by duplicating the original data set using the meta data information from the snapshot of the data structure and storing the duplicated data set in a non-volatile target memory.

It should be noted that for purposes of the present disclosure the term "snapshot" shall be interpretated as a specific type of backup. The term "backup" shall be interpreted broadly to refer to any duplication of a volume that allows the volume to be restored if necessary.

As mentioned earlier, backups are not stored indefinitely. They are deleted after some sort of retention period expires. In an example embodiment, a backup deletion component 180 acts to delete backups in the persistent memory 150 in accordance with a specified retention period. In a further example embodiment, the retention period may vary from backup-to-backup based on the importance of the corresponding volume. Thus a backup of volume A stored in persistent memory 150 may have a different retention period than a backup of volume B stored in persistent memory 150.

In some example embodiment, a clock is used to track the time between when the backup is created and when it is deleted. Specifically, the clock may be used to track a time and date when the backup is created. The determined retention period may then be added to that time and date to produce a deletion time and date. When the clock reaches that deletion time and date, the backup may be deleted.

Figure 2:
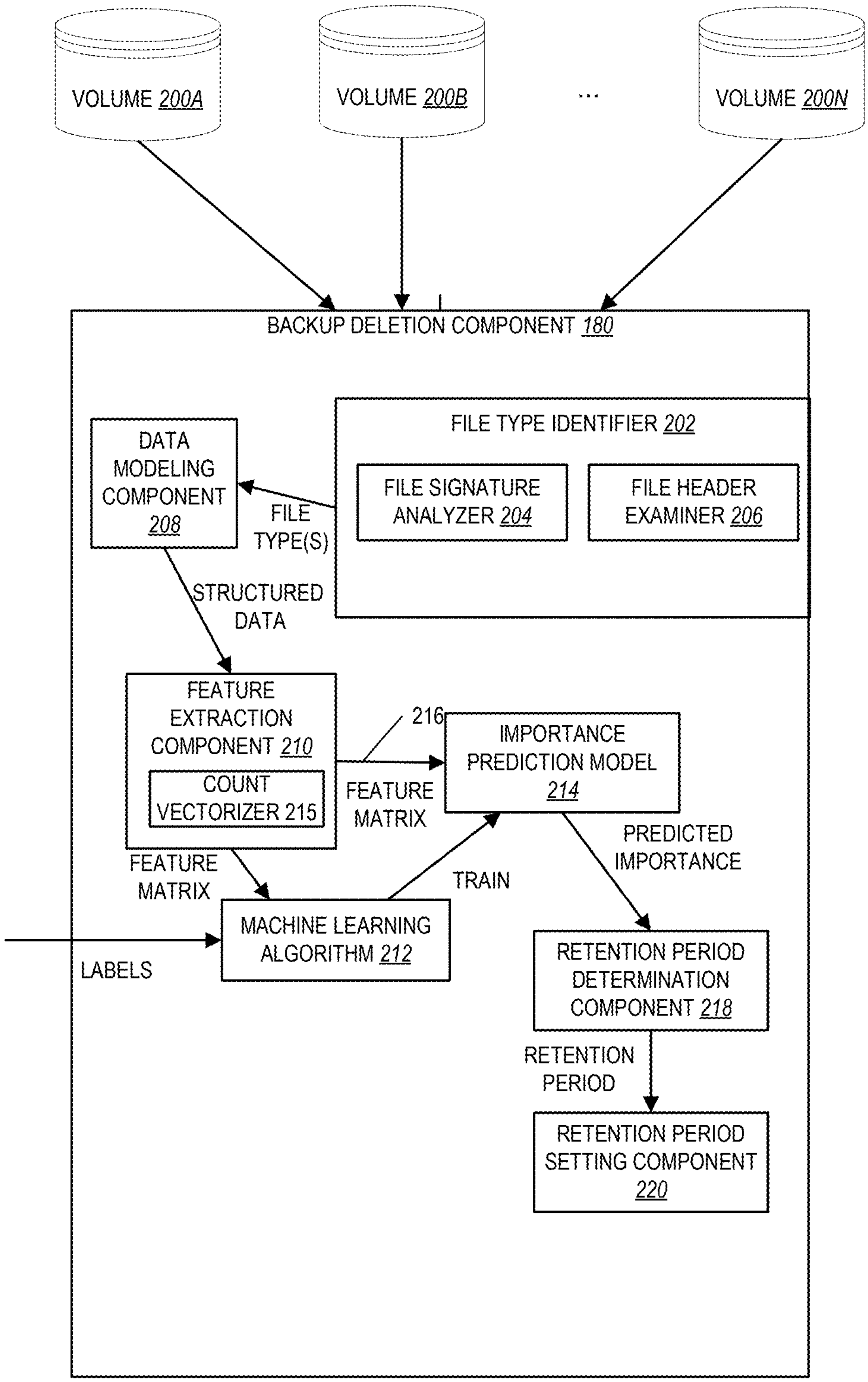
FIG. 2 is a block diagram illustrating the backup deletion component of FIG. 1 in more detail, in accordance with an example embodiment.

FIG. 2 is a block diagram illustrating the backup deletion component 180 of FIG. 1 in more detail, in accordance with an example embodiment. Notably, the backup deletion component 180 acts to set retention periods for a plurality of different volumes 200A-200N. These volumes 200A-200N may include volumes stored in the in-memory database of FIG. 1 but could include other volumes, either in addition to or in lieu of those stored in the in-memory database of FIG. 1.

A file type identifier 202 acts to identify file types stored in each of the volumes 200A-200N. Each volume 200A-200N could, of course, store any number of different files and these files may be stored in any number of different file formats. Different file formats have different likelihoods of being of high importance than others, at least based on the environment in which they are utilized. For example, log files in a production environment (an environment where computer software is being produced) tend to contain important information that is needed to restore a volume if needed. Log files in other environments, such as a Quality Assurance (QA) environment, may not be as important, and other file type may not be important in any environment, for example.

Some file types are easy to identify. In some volumes, for example, one or more files may be stored in a manner that makes their type obvious, such as in volumes where a file extension (e.g., ".log" for log files) is appended to the file name for a file, with the file extension uniquely corresponding to a particular file type. In other scenarios, however, the file type may not be so easy to determine. As such, in some example embodiments, the file type identifier may include one or more components to aid in identification of file types. These may include, for example, a file signature analyzer 204 and a file header examiner 206. The file signature analyzer 204 may examine unique signatures or patterns within files to help determine their types. In an example embodiment, the file signature analyzer 204 looks for specific byte sequences at the beginning of a file that identify its type. Some examples of patterns or signatures include:

1) JPEG Image (JPEG/EXIF)
   Signature (Magic Bytes): FF D8 FF E0 or FF D8 FF E1
   File Type: JPEG Image (.jpg, .jpeg)
   Explanation: JPEG files begin with these specific hex bytes, which indicate the start of a JPEG file.
2) Portable Document Format (PDF)
   Signature (Magic Bytes): 25 50 44 46 (ASCII for % PDF)
   File Type: PDF Document (.pdf)
   Explanation: The PDF format is identified by the ASCII characters % PDF at the start of the file.
3) ZIP Archive
   Signature (Magic Bytes): 50 4B 03 04 (ASCII for PK)
   File Type: ZIP Archive (.zip)
   Explanation: ZIP files start with these bytes, representing the PKZIP format. Other formats like JAR or DOCX (which are essentially ZIP-based) may also start with this signature.
4) Executable File (Windows PE)
   Signature (Magic Bytes): 4D 5A
   File Type: Windows Executable (.exe)
   Explanation: The 4D 5A hex sequence translates to MZ, which is the magic number for Windows executable files.

The file header examiner 206 analyzes the headers of files to files to help determine their types. In an example embodiment, the file header examiner 206 looks at metadata or structural information found in the headers of files to determine their types. The following are some examples of headers and their corresponding types:

1) ELF File (Executable and Linkable Format)
   Header: 7F 45 4C 46 (ASCII for .ELF)
   File Type: ELF Executable (.elf)
   Explanation: ELF files, used in Unix-like systems, have a header that begins with .ELF, which helps identify it as an executable.
2) MP3 Audio File
   Header: Starts with ID3
   File Type: MP3 Audio (.mp3)
   Explanation: MP3 files often contain ID3 metadata tags, which help identify the file as an MP3. The presence of ID3 in the header typically signifies an MP3 file.
3) PNG Image
   Header: 89 50 4E 47 0D 0A 1A 0A
   File Type: PNG Image (.png)
   Explanation: PNG images contain this specific byte sequence in the header, making them distinguishable from other image formats.

The file signature analyzer 204 and file header examiner 206 can each be implemented as a model that takes as input a file and outputs an indication of a file type based on some features of the file. In some example embodiments, these models may be machine learning models. Specifically, the models may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbors, decision trees, and hidden Markov models.

In an example embodiment, a machine learning algorithm used to train a machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of these machine learning models may take place as a dedicated training phase. In other example embodiments, the machine learning models may be retrained dynamically at runtime based on, for example, developer or user feedback.

The output of the file type identifier 202 is an identification of a file type of files stored within a volume that the file type identifier 202 is examining. Next, a data modeling component 208 acts to structure data about the volume, and specifically about files within the volume, in a way that facilitates effective machine learning model training and inference. In the context of dynamic backup retentions, this data about the volume is a dataset that captures relevant information about volumes, file types, and (in the case of training data) their associated importance levels. In an example embodiment, this dataset may include, for each volume, a volume identifier that uniquely identifies the volume, an environment identifier that uniquely identifies the environment in which the volume is utilized, and one or more file types presented in the volume. In the case of datasets to be used for training, each combination of volume and environment is assigned an importance. This importance acts a label for use in machine learning to train a model to predict such a label for volume and environment combinations that do not have a label. In some example embodiments, these importance labels are assigned by a human, although embodiments are possible where the labels are automatically generated by a machine learning model of its own.

A feature extraction component 210 transforms raw data, specifically the data from the dataset created by the data modeling component 208, into a format suitable for a machine learning algorithm 212 to be used to train an importance prediction model 214. In an example embodiment, the importance prediction model 214 is implemented as an SVM model, and thus the feature extraction component 210 acts to transform raw data into a format suitable for an SVM model. This involves representing the data in a numerical format. More specifically, the feature extraction component 210 may implement a count vectorizer 215, which acts to convert a collection of text (such as file type identifications) into a matrix of token counts. Each row represents a volume, and each column represents a unique file type. An example feature matrix is as follows:

| VolumeID | log | txt | conf | ini | . . . |
|---|---|---|---|---|---|
| 1 | 1 | 1 | 1 | 0 | . . . |
| 2 | 1 | 0 | 0 | 1 | . . . |
| . . . | . . . | . . . | . . . | . . . | . . . |

In some example embodiments, the cells in the body of the feature matrix represent an indication of whether or not the corresponding file type is present in the corresponding volume (e.g., “1” if the file type is present, “0” if it is not). In other example embodiments, the cells in the body of the feature matrix represent a count of the number of files of the corresponding file type in the corresponding volume. The choice as to which embodiment to use depends on whether the count of the number of files of corresponding file types is relevant to the determination of importance of the underlying volume. In some scenarios, for example, a volume with 999 files of file type A and 1 file of file type B is more important than a volume with 1 file of file type A and 1 file of file type B. In other scenarios, both such volumes would have equal importance due to the presence of the same file types, regardless of count.

The machine learning algorithm 212 may, as described earlier, use SVM training techniques to train the importance prediction model 214. This may be based on training data comprising the transformed dataset from the feature extraction component 210 along with labels for each volume or volume/environment combination. This may include creating an SVM classifier using specified parameters (e.g., linear kernel), and then feeding the feature matrix and corresponding importance labels into the SVM classifier for training. Example pseudocode representing this process may be as follows:

```
from sklearn import svm
import numpy as np
X = np.array([[1, 1, 1, 0], [1, 0, 0, 1], ...])  # Feature matrix
y = np.array(['High', 'Low', ...])  # Importance labels
clf = svm.SVC(kernel='linear')  # Create SVM classifier
clf.fit(X, y)  # Train the classifier
```

Once trained, the SVM model becomes adept at predicting the importance level of a new volume based on its file types and environment. This is represented by path 216 in FIG. 2. The output of the importance prediction model 214 is a prediction of an importance level for the new volume. It should be noted that this importance level can be assigned based on any classification scheme. In a simple example, importance levels are one of “high”, “medium”, or “low”. In another example, importance levels are integers between 0 and 10, with 10 being the most important and 0 being the other. Other possible scales, granularities, and classification schemes are possible.

It should be noted that the term “importance” is not intended to imply an overarching determination of a value or other characteristic of a volume. In this case, it is intended to indicate a level of necessity to save a backup for a longer period of time. The assumption is that this would be based on some sort of determination that certain file types indicate files that are more necessary to keep for longer than others in case of an emergency or other problem that threatens the primary version of the volume. The way the systems described herein are implemented, however, it is the labels used for training that determine whether something is important or not. In other words, a volume in the training data is deemed to be “important” if its label indicates that it is important, and the importance prediction model 214 predicts the "importance" of a new volume based on its similarity to volumes with labels in the training data, as opposed to an overarching or independent determination of value, worth, or some other feature.

Additionally, while the predicted importance is based on the file types in the volume and the environment of the volume, how the environment is used by the importance prediction model 214 can vary based on implementation. In some example embodiments, the environment is passed as a feature to the machine learning algorithm 212, which learns which combinations of environment and file types are important and which are not. In other example embodiments, the environment consideration is set as a rule, outside of the learning process, and thus may be implemented in the importance prediction model 214 as a predefined rule, such as a rule indicating that volumes in all environments other than "production" are always considered to be "low" importance, essentially making the importance prediction model 214 only need to use its actually machine learning trained portion when the volume is in a production environment, and simply outputting "low" or the like for any volume not in a production environment.

Nevertheless, the predicted importance level of the new volume is passed to a retention period determination component 218. The retention period determination component 218 then selects a specific retention period for the new volume based on the predicted importance level. In some example embodiments, this may involve a preassigned retention period for each importance level. In some further example embodiments, these preassigned retention periods may be customer-specific, such that a particular importance level may result in one retention period for one customer but a different retention period for another customer. Other retention period-to-importance level determinations may be even more complex, such as those that include other factors in the determination in addition to the importance level of the volume, such as volume size, resource cost, etc.

A retention period setting component 220 then sets the retention period for the new volume to the specific retention period selected by the retention period determination component 218. This my include, for example, interfacing with the respective cloud provider's Backup Retention Configuration API(s). These API(s) allow for programmable and automated management of backup policies, providing the necessary flexibility for dynamic adjustments. The cloud platform then adjusts the retention period for snapshots or backups associated with the specified volume. The system may then receive confirmation of the configuration change and implements monitoring mechanisms to ensure the cloud platform adheres to the specified retention period.

The present techniques allow for the dynamic adjustment of backup retention periods based on changes in SVM predictions. This ensures that the backup strategy remains responsive to evolving data importance patterns. For example:

Volume Y historically classified as low importance starts receiving more high importance files.

The SVM model dynamically adjusts the predicted importance level for Volume Y. The system, recognizing the change, dynamically adjusts the backup retention period for Volume Y.

In a further example embodiment, to enhance visibility and facilitate auditing, the system includes a feature for tagging snapshots or backups with metadata indicating the reason for their retention period. This metadata may include the SVM-predicted importance level. For example Every snapshot or backup associated with Volume Z is tagged with metadata indicating the SVM-predicted importance level (e.g., "High").

In another example embodiment, a quota and governance feature is introduced, allowing administrators to define base cost budgets and scalability limits. This ensures a balance between defined backups and cost management. Administrators have the ability to change upper limits, budgets, and tier configurations. This governance mechanism allows for dynamic adjustments based on evolving requirements. For example:

The administrator sets a quota ensuring that backups are adjusted within a $1000 budget. The system dynamically adapts retention periods while adhering to this budget, maintaining a minimum and maximum defined by the administrator. For example, admin can configure a minimum and maximum value for each teir in a configuration file.

Sample config
data:

```
tier: 1
min_days: 3
max_days: 15
tier: 2
min_days: 3
max_days: 15
tier: 3
min_days: 5
max_days: 30
tier: 10
min_days: 15
max_days: 30
```

Figure 3:
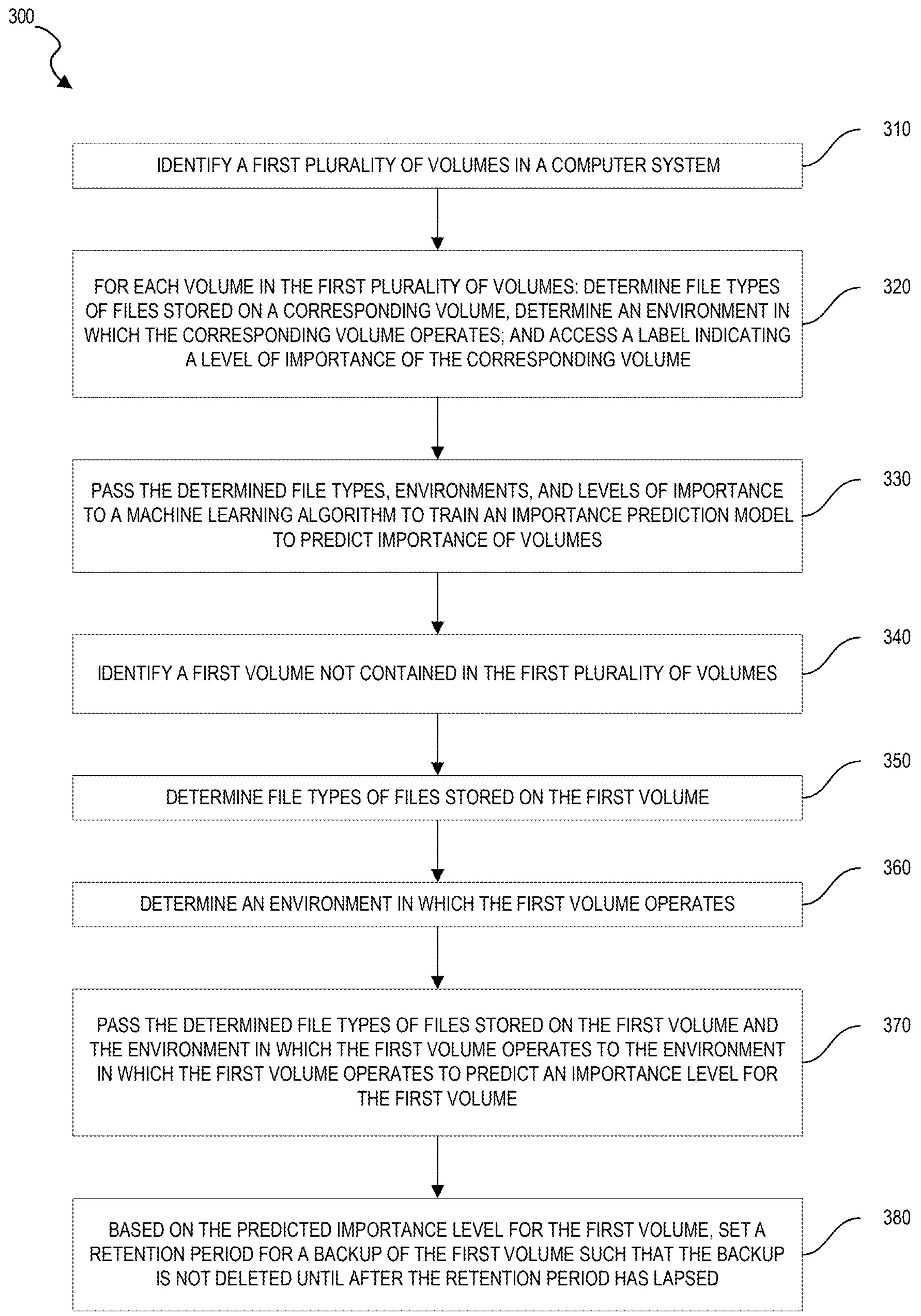
FIG. 3 is a flowchart of an example method for automatically setting a retention period for a backup up a volume, in accordance with an example embodiment.

FIG. 3 is a flowchart of an example method for automatically setting a retention period for a backup up a volume, in accordance with an example embodiment.

At operation 310, a first plurality of volumes in a computer system is identified.

At operation 320, for each volume in the first plurality of volumes: file types of files stored on a corresponding volume are determined, an environment in which the corresponding volume operates is determined; and a label indicating a level of importance of the corresponding volume is accessed.

At operation 330, the determined file types, environments, and levels of importance are passed to a machine learning algorithm to train an importance prediction model to predict importance of volume.

At operation 340, a first volume not contained in the first plurality of volumes is identified.

At operation 350, file types of files stored on the first volume are determined.

At operation 360, an environment in which the first volume operates is determined.

At operation 370, the determined file types of files stored on the first volume and the environment in which the first volume operates to the environment in which the first volume operates are passed to an importance prediction model to predict an importance level for the first volume.

At operation 380, based on the predicted importance level for the first volume, a retention period for a backup of the first volume is set such that the backup is not deleted until after the retention period has lapsed.

In view of the disclosure above, various examples are set forth below. It should be noted that one or more features of an example, taken in isolation or combination, should be considered within the disclosure of this application.

Example 1 is a system comprising: at least one hardware processor; and a non-transitory computer-readable medium storing instructions that, when executed by the at least one hardware processor, cause the at least one hardware processor to perform operations comprising: identifying a first plurality of volumes in a computer system; for each volume in the first plurality of volumes: determining file types of files stored on a corresponding volume; determining an environment in which the corresponding volume operates; and accessing a label indicating a level of importance of the corresponding volume; passing the determined file types, environments, and levels of importance to a machine learning algorithm to train an importance prediction model to predict importance of volumes; identifying a first volume not contained in the first plurality of volumes; determining file types of files stored on the first volume; determining an environment in which the first volume operates; passing the determined file types of files stored on the first volume and the environment in which the first volume operates to the environment in which the first volume operates to predict an importance level for the first volume; and based on the predicted importance level for the first volume, setting a retention period for a backup of the first volume such that the backup is not deleted until after the retention period has lapsed.

In Example 2, the subject matter of Example 1 comprises, wherein the determining file types of files stored in the corresponding volume is performed using file signature analysis and file header examination.

In Example 3, the subject matter of Examples 1-2 comprises, wherein the machine learning algorithm is a Support Vector Machines (SVM) algorithm.

In Example 4, the subject matter of Examples 1-3 comprises, wherein the setting a retention period comprises: invoking a cloud provider's backup retention configuration application program interface (API) using an identification of the first volume and the retention period.

In Example 5, the subject matter of Examples 1~4 comprises, wherein the backup is tagged with the importance level.

In Example 6, the subject matter of Examples 1-5 comprises, wherein the operations further comprise: prior to the passing the determined file types, environments, and levels of importance to the machine learning algorithm, generating a feature matrix, each row of the feature matrix corresponding to a different volume and environment combination and the feature matrix having a plurality of file type columns, each file type column corresponding to a different potential file type, and wherein each cell in a file type column in a body of the feature matrix contains an indication of whether a corresponding volume contained a file with a corresponding file type.

In Example 7, the subject matter of Example 6 comprises, wherein each cell in a file type column in a body of the feature matrix further contains a count of how many files with a corresponding file type are contained within a corresponding volume.

Example 8 is a method comprising: identifying a first plurality of volumes in a computer system; for each volume in the first plurality of volumes: determining file types of files stored on a corresponding volume; determining an environment in which the corresponding volume operates; and accessing a label indicating a level of importance of the corresponding volume; passing the determined file types, environments, and levels of importance to a machine learning algorithm to train an importance prediction model to predict importance of volumes; identifying a first volume not contained in the first plurality of volumes; determining file types of files stored on the first volume; determining an environment in which the first volume operates; passing the determined file types of files stored on the first volume and the environment in which the first volume operates to the environment in which the first volume operates to predict an importance level for the first volume; and based on the predicted importance level for the first volume, setting a retention period for a backup of the first volume such that the backup is not deleted until after the retention period has lapsed.

In Example 9, the subject matter of Example 8 comprises, wherein the determining file types of files stored in the corresponding volume is performed using file signature analysis and file header examination.

In Example 10, the subject matter of Examples 8-9 comprises, wherein the machine learning algorithm is a Support Vector Machines (SVM) algorithm.

In Example 11, the subject matter of Examples 8-10 comprises, wherein the setting a retention period comprises: invoking a cloud provider's backup retention configuration application program interface (API) using an identification of the first volume and the retention period.

In Example 12, the subject matter of Examples 8-11 comprises, wherein the backup is tagged with the importance level.

In Example 13, the subject matter of Examples 8-12 comprises, prior to the passing the determined file types, environments, and levels of importance to the machine learning algorithm, generating a feature matrix, each row of the feature matrix corresponding to a different volume and environment combination and the feature matrix having a plurality of file type columns, each file type column corresponding to a different potential file type, and wherein each cell in a file type column in a body of the feature matrix contains an indication of whether a corresponding volume contained a file with a corresponding file type.

In Example 14, the subject matter of Example 13 comprises, wherein each cell in a file type column in a body of the feature matrix further contains a count of how many files with a corresponding file type are contained within a corresponding volume.

Example 15 is a non-transitory machine-readable medium storing instructions which, when executed by one or more processors, cause the one or more processors to perform operations comprising: identifying a first plurality of volumes in a computer system; for each volume in the first plurality of volumes: determining file types of files stored on a corresponding volume; determining an environment in which the corresponding volume operates; and accessing a label indicating a level of importance of the corresponding volume; passing the determined file types, environments, and levels of importance to a machine learning algorithm to train an importance prediction model to predict importance of volumes; identifying a first volume not contained in the first plurality of volumes; determining file types of files stored on the first volume; determining an environment in which the first volume operates; passing the determined file types of files stored on the first volume and the environment in which the first volume operates to the environment in which the first volume operates to predict an importance level for the first volume; and based on the predicted importance level for the first volume, setting a retention period for a backup of the first volume such that the backup is not deleted until after the retention period has lapsed.

In Example 16, the subject matter of Example 15 comprises, wherein the determining file types of files stored in the corresponding volume is performed using file signature analysis and file header examination.

In Example 17, the subject matter of Examples 15-16 comprises, wherein the machine learning algorithm is a Support Vector Machines (SVM) algorithm.

In Example 18, the subject matter of Examples 15-17 comprises, wherein the setting a retention period comprises: invoking a cloud provider's backup retention configuration application program interface (API) using an identification of the first volume and the retention period.

In Example 19, the subject matter of Examples 15-18 comprises, wherein the backup is tagged with the importance level.

In Example 20, the subject matter of Examples 15-19 comprises, prior to the passing the determined file types, environments, and levels of importance to the machine learning algorithm, generating a feature matrix, each row of the feature matrix corresponding to a different volume and environment combination and the feature matrix having a plurality of file type columns, each file type column corresponding to a different potential file type, and wherein each cell in a file type column in a body of the feature matrix contains an indication of whether a corresponding volume contained a file with a corresponding file type.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
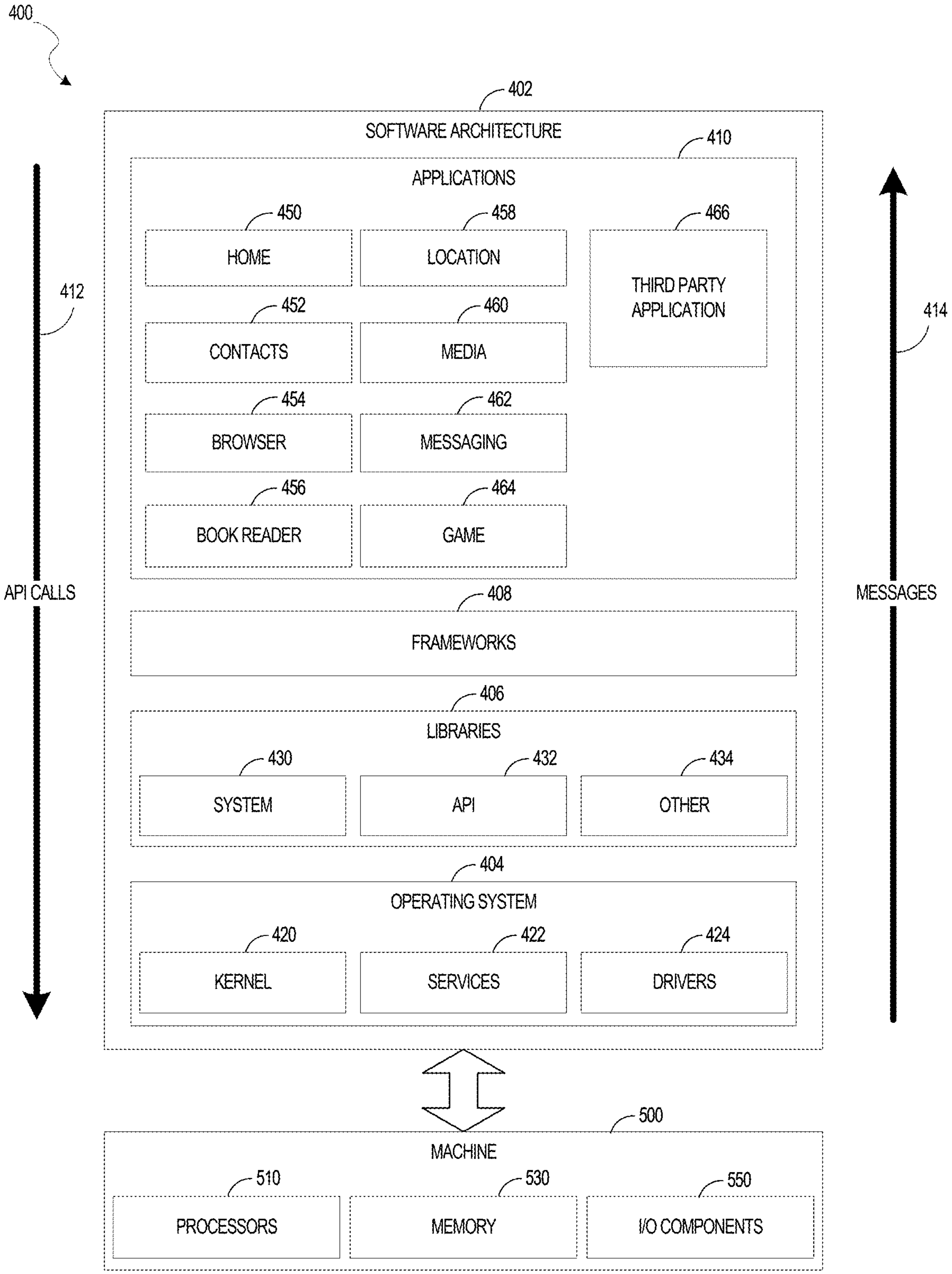
FIG. 4 is a block diagram illustrating a software architecture, in accordance with an example embodiment.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that comprises processors 510, memory 530, and input/output (I/O) components 550. In this example architecture, the software architecture 402 can be conceptualized as a stack of layers where each layer may provide a particular functionality. For example, the software architecture 402 comprises layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 comprises, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can comprise display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can comprise system libraries 430 (e.g., C standard library) that can provide functions such as memory allocation functions, string manipulation functions, mathematic functions, and the like. In addition, the libraries 406 can comprise API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also comprise a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 comprise a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
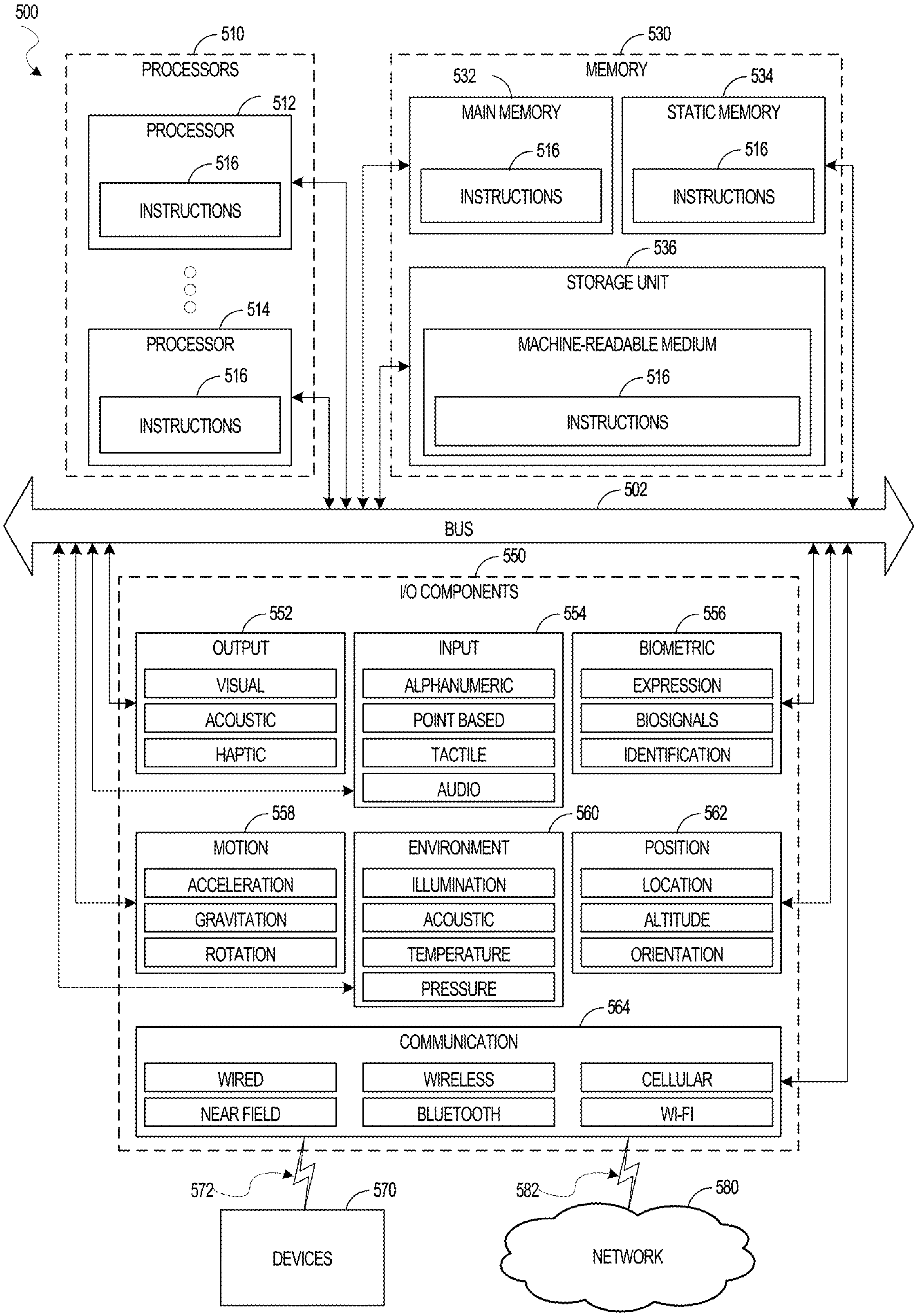
FIG. 5 illustrates a diagrammatic representation of a machine in the form of a computer system within which a set of instructions may be executed for causing the machine to perform any one or more of the methodologies discussed herein.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3 and/or the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to comprise a collection of machines 500 that individually or jointly execute the instructions 516 to perform any one or more of the methodologies discussed herein.

The machine 500 may comprise processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may comprise, for example, a processor 512 and a processor 514 that may execute the instructions 516. The term "processor" is intended to comprise multi-core processors that may comprise two or more independent processors (sometimes referred to as "cores") that may execute instructions 516 contemporaneously. Although FIG. 5 shows multiple processors 510, the machine 500 may comprise a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may comprise a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may comprise a wide variety of components to receive input, provide output, produce output, transmit information, exchange information, capture measurements, and so on. The specific I/O components 550 that are comprised in a particular machine will depend on the type of machine. For example, portable machines such as mobile phones will likely comprise a touch input device or other such input mechanisms, while a headless server machine will likely not comprise such a touch input device. It will be appreciated that the I/O components 550 may comprise many other components that are not shown in FIG. 5. The I/O components 550 are grouped according to functionality merely for simplifying the following discussion, and the grouping is in no way limiting. In various example embodiments, the I/O components 550 may comprise output components 552 and input components 554. The output components 552 may comprise visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may comprise alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may comprise biometric components 556, motion components 558, environmental components 560, or position components 562, among a wide array of other components. For example, the biometric components 556 may comprise components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may comprise acceleration sensor components (e.g., accelerometer), gravitation sensor components, rotation sensor components (e.g., gyroscope), and so forth. The environmental components 560 may comprise, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may comprise location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may comprise communication components 564 operable to couple the machine 500 to a network 580 or devices 570 via a coupling 582 and a coupling 572, respectively. For example, the communication components 564 may comprise a network interface component or another suitable device to interface with the network 580. In further examples, the communication components 564 may comprise wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or comprise components operable to detect identifiers. For example, the communication components 564 may comprise radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to comprise, but not be limited to, solid-state memories, and optical and magnetic media, comprising memory internal or external to processors. Specific examples of machine-storage media, computer-storage media, and/or device-storage media comprise non-volatile memory, comprising by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may comprise a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) comprising 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component comprised in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to comprise any intangible medium that is capable of storing, encoding, or carrying the instructions 516 for execution by the machine 500, and comprise digital or analog communications signals or other intangible media to facilitate communication of such software. Hence, the terms "transmission medium" and "signal medium" shall be taken to comprise any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to comprise both machine-storage media and transmission media. Thus, the terms comprise both storage devices/media and carrier waves/modulated data signals.

What is claimed is:

1. A system comprising:

at least one hardware processor; and a non-transitory computer-readable medium storing instructions that, when executed by the at least one hardware processor, cause the at least one hardware processor to perform operations comprising:

identifying a first plurality of volumes in a computer system;

for each volume in the first plurality of volumes:

determining file types of files stored on a corresponding volume, the files comprising a plurality of different file types;

determining an environment in which the corresponding volume operates; and accessing a label indicating a level of importance of the corresponding volume;

passing the determined file types, environments, and levels of importance to a machine learning algorithm to train an importance prediction model to predict importance of volumes;

identifying a first volume not contained in the first plurality of volumes;

determining file types of files stored on the first volume;

determining an environment in which the first volume operates;

generating a feature matrix, each row of the feature matrix corresponding to a different volume and environment combination and the feature matrix having a plurality of file type columns, each file type column corresponding to a different potential file type, and wherein each cell in a file type column in a body of the feature matrix contains an indication of whether a corresponding volume contained a file with a corresponding file type;

passing the determined file types of files stored on the first volume and the environment in which the first volume operates to the importance prediction model to predict an importance level for the first volume; and based on the importance level for the first volume predicted by the importance prediction model, setting a retention period for a backup of the first volume, the backup comprising all files stored on the first volume regardless of file type, such that the backup is not deleted until after the retention period has lapsed.

2. The system of claim 1, wherein the determining file types of files stored in the corresponding volume is performed using file signature analysis and file header examination.

3. The system of claim 1, wherein the machine learning algorithm is a Support Vector Machines (SVM) algorithm.

4. The system of claim 1, wherein the setting a retention period comprises: invoking a cloud provider's backup retention configuration application program interface (API) using an identification of the first volume and the retention period.

5. The system of claim 1, wherein the backup is tagged with the importance level.

6. The system of claim 1, wherein each cell in a file type column in a body of the feature matrix further contains a count of how many files with a corresponding file type are contained within a corresponding volume.

7. The system of claim 1, further comprising a clock, and wherein the operations further comprise:

tracking, using the clock, a time and date when the backup of the first volume was created;

adding the retention period to the time and date to determine a deletion time and date; and deleting the backup of the first volume when the clock reaches the deletion time and date.

8. A method comprising:

identifying a first plurality of volumes in a computer system;

for each volume in the first plurality of volumes:

determining file types of files stored on a corresponding volume, the files comprising a plurality of different file types;

determining an environment in which the corresponding volume operates; and accessing a label indicating a level of importance of the corresponding volume;

passing the determined file types, environments, and levels of importance to a machine learning algorithm to train an importance prediction model to predict importance of volumes;

identifying a first volume not contained in the first plurality of volumes;

determining file types of files stored on the first volume;

determining an environment in which the first volume operates;

generating a feature matrix, each row of the feature matrix corresponding to a different volume and environment combination and the feature matrix having a plurality of file type columns, each file type column corresponding to a different potential file type, and wherein each cell in a file type column in a body of the feature matrix contains an indication of whether a corresponding volume contained a file with a corresponding file type;

passing the determined file types of files stored on the first volume and the environment in which the first volume operates to the importance prediction model to predict an importance level for the first volume; and based on the importance level for the first volume predicted by the importance prediction model, setting a retention period for a backup of the first volume, the backup comprising all files stored on the first volume regardless of file type, such that the backup is not deleted until after the retention period has lapsed.

9. The method of claim 8, wherein the determining file types of files stored in the corresponding volume is performed using file signature analysis and file header examination.

10. The method of claim 8, wherein the setting a retention period comprises: invoking a cloud provider's backup retention configuration application program interface (API) using an identification of the first volume and the retention period.

11. The method of claim 8, wherein the backup is tagged with the importance level.

12. The method of claim 8, wherein each cell in a file type column in a body of the feature matrix further contains a count of how many files with a corresponding file type are contained within a corresponding volume.

13. A non-transitory machine-readable medium storing instructions which, when executed by one or more processors, cause the one or more processors to perform operations comprising:

identifying a first plurality of volumes in a computer system;

for each volume in the first plurality of volumes:

determining file types of files stored on a corresponding volume, the files comprising a plurality of different file types;

determining an environment in which the corresponding volume operates; and accessing a label indicating a level of importance of the corresponding volume;

passing the determined file types, environments, and levels of importance to a machine learning algorithm to train an importance prediction model to predict importance of volumes;

identifying a first volume not contained in the first plurality of volumes;

determining file types of files stored on the first volume;

determining an environment in which the first volume operates;

generating a feature matrix, each row of the feature matrix corresponding to a different volume and environment combination and the feature matrix having a plurality of file type columns, each file type column corresponding to a different potential file type, and wherein each cell in a file type column in a body of the feature matrix contains an indication of whether a corresponding volume contained a file with a corresponding file type;

passing the determined file types of files stored on the first volume and the environment in which the first volume operates to the importance prediction model to predict an importance level for the first volume; and based on the importance level for the first volume predicted by the importance prediction model, setting a retention period for a backup of the first volume, the backup comprising all files stored on the first volume regardless of file type, such that the backup is not deleted until after the retention period has lapsed.

14. The non-transitory machine-readable medium of claim 13, wherein the determining file types of files stored in the corresponding volume is performed using file signature analysis and file header examination.

15. The non-transitory machine-readable medium of claim 13, wherein the machine learning algorithm is a Support Vector Machines (SVM) algorithm.

16. The non-transitory machine-readable medium of claim 13, wherein the setting a retention period comprises:

invoking a cloud provider's backup retention configuration application program interface (API) using an identification of the first volume and the retention period.

17. The non-transitory machine-readable medium of claim 13, wherein the backup is tagged with the importance level.

* * * * *